United States Patent Office 3,260,056
Patented July 12, 1966

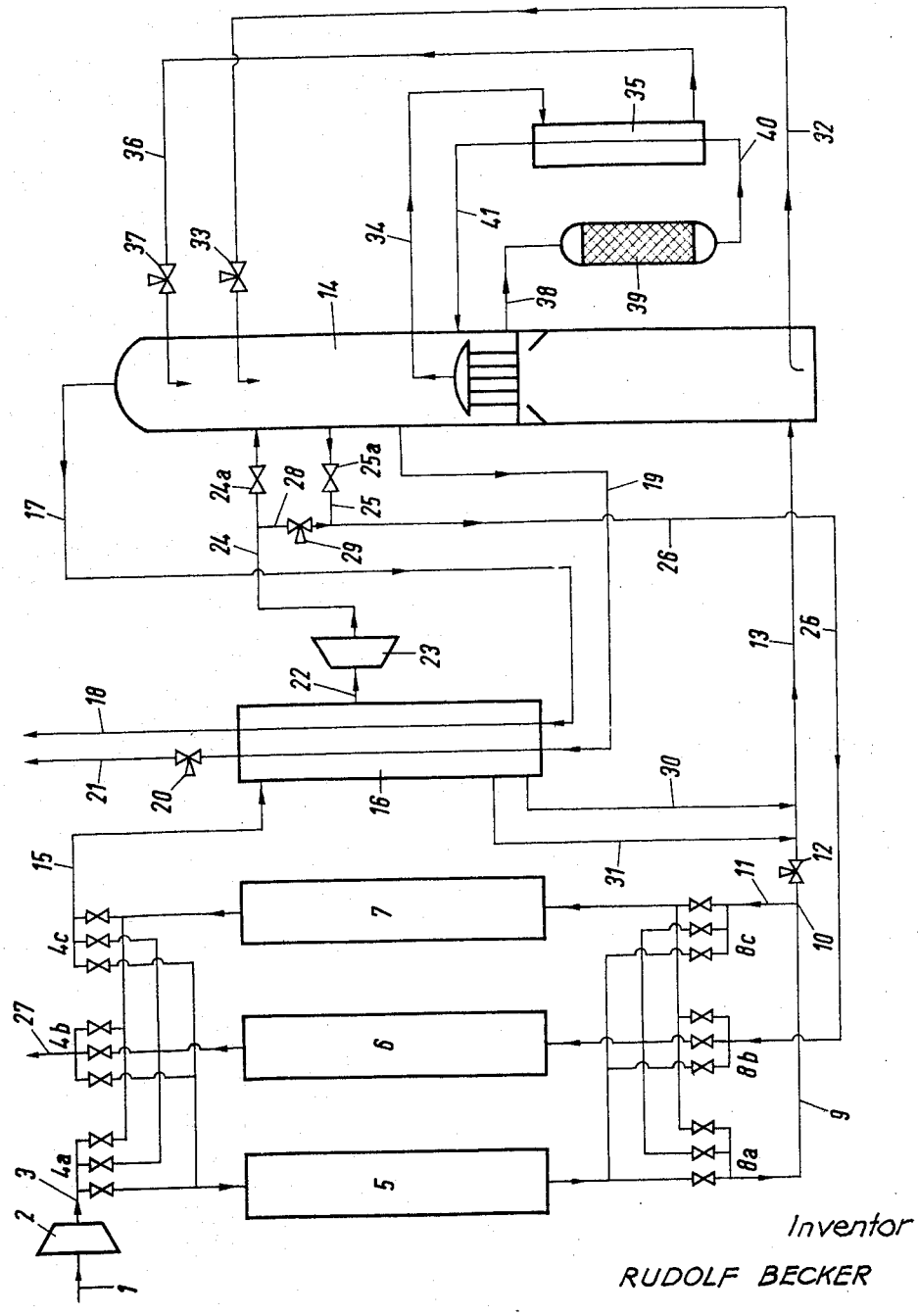

3,260,056
REGENERATIVE HEAT EXCHANGE IN LOW
TEMPERATURE GAS FRACTIONATION
Rudolf Becker, Munich-Solln, Germany, assignor to
Linde Aktiengesellschaft
Filed Jan. 8, 1963, Ser. No. 250,062
Claims priority, application Germany, Jan. 12, 1962,
G 34,001
12 Claims. (Cl. 62—13)

This invention relates to a process and an apparatus for the low temperature fractional distillation of a normally gaseous feed, preferably air, in which liquefiable impurities are separated in cyclically interchangeable regenerators, and in which each regenerator during its first cycle, cools the gas to be fractionated and removes liquefiable impurities therefrom, during its second cycle is traversed in the reverse direction by a scavenging gas for revaporizing the impurities which were condensed from the crude gas, and in its third cycle serves to reheat a portion of the previously cooled and purified feed stream.

The air fractionating systems now in common use for obtaining pure nitrogen operate on the so-called medium pressure process, which comprises compressing the air to 8–25 atm. (gage); drying the air with adsorbers; separating the $CO_2$ with alkali or adsorbers; and cooling it by passage through an expanding means such as a turbine. Attending to the drying and $CO_2$ adsorption columns is, however, troublesome. In particular, by changing these columns, the thermal equilibrium of the system is often sufficiently disrputed so as to necessitate a readjustment.

Processes are also known which make the use of regenerative heat exchange, but in such processes a large portion of the separated fraction, usually nitrogen, must be used for sublimation of the condensed water and $CO_2$. This gaseous fraction will, therefore, come out impure so that only a small portion of the nitrogen fraction can be withdrawn from the system in pure form.

The principal object of this invention, therefore, is to provide a process for the low temperature fractionation of gases, particularly air, which process substantially avoids the disadvantages of the prior art as hereinbefore described.

Another object of this invention is to provide a novel apparatus for conducting the process of the invention.

Upon further study of the specification and appended claims, other objects and advantages will become apparent.

According to this invention the difficulties of the prior art are avoided by passing through each regenerator, during its first cycle, a mass of crude gas which is greater than what would be necessary for the production of a desired quantity of a pure fraction—greater by an amount equal to the scavenging gas that will have to be returned during the second cycle for the sublimation of the impurities that were separated in the regenerator. A portion of this highly cooled and cleaned gaseous mass from the regenerator in its first cycle is then warmed up again in a regenerator in the third stage, and from there is conducted into a heat exchanger in countercurrent relation to a separated fraction that is to be warmed. A major portion of the cleaned feed from the heat exchanger is diverted and preferably after being mixed with an impure fraction, is passed through a regenerator in its second stage to serve as scavenging gas, while the minor portion is combined with the rest of the cooled clean gas from the regenerator that is in its first cycle and the resultant mixture is delivered to the rectification column.

The attached drawing is a schematic flow sheet of the process of this invention.

This process has the advantage in that the scavenging gas which is required for the removal of $H_2O$ and $CO_2$ does not need to be returned to the rectification column. Thus, a smaller rectification column is required along with a correspondingly lower consumption of refrigeration energy. Accordingly, the use of driers and adsorbers for removal of the $H_2O$ and $CO_2$ is also avoided. The total necessary apparatus, and the cost thereof, is thus substantially reduced.

The energy required in this process for compressing large quantities of air to 6 atm. (absolute) is not greater than has heretofore been necessary for obtaining pure nitrogen, but in the previous systems, elaborate recuperative heat exchangers and adsorbers, or alkaline scrubbers for removal of water and $CO_2$, and additionally air compressors operating between 8 and 25 atms. were required.

In this invention, a gas or air volume is used which is so large that the sublimation ratio, i.e., ratio of the effective volume of the scavenging air at slightly positive pressure (absolute pressure being about 1,2 atm.) to the total volume of gas or air under the pressure conditions existing when it is fed to the first-cycle regenerators, e.g. 6 atm. pressure (absolute), is preferably between 1 and 4, beneficially less than 2, and even more beneficially between 1.3 and 2. As a numerical example, a sublimation ratio of 2 means that 100 m.$^3$ scavenging gas at a slightly positive pressure (ca. 110 Nm.$^3$) there will be for 50 compressed m.$^3$ of feed (ca. 250 Nm.$^3$).

Another feature of this invention is that a major portion, preferably about 60–80%, of the heated gas from a regenerator that is in its third cycle and subsequently passed through a heat exchanger for heating the pure fractions (e.g. $N_2$ and $O_2$) of the final products, is diverted from about the middle of the heat exchanger, passed through an expansion device such as a turbine, and is then used as scavenging gas in a regenerator that is in its second cycle. This scavenging air leaving the second regenerator, and having undergone only a slight change in composition, is then discarded. This discarded air, according to the amount of the nitrogen or oxygen removed therefrom, may be slightly oxygen- or nitrogen-rich.

Under certain conditions it may also be advantageous to combine such a major portion of gas that has been diverted from the heat exchanger and after its passage through an expansion turbine, with an impure fraction from the rectification column and return it to a regenerator that is in its second cycle, to be used as scavenging gas. This type of operation is particularly advantageous in order to hold the necessary cold balance.

The remaining minor amount of air from the countercurrent heat exchanger may then be combined in its partly liquid and partly gaseous condition with the air or gas which has successively passed through a regenerator in its first cycle and then through an expansion valve. This mixture is then introduced at the bottom of the pressure section of a rectification column.

According to the demand for pure nitrogen or pure oxygen, some or all of the air from the expansion turbine may be delivered to the low pressure section of the rectification column before the same amount of it, with possibly some enrichment, is returned for use as scavenger gas in a regenerator that is in its second cycle.

In this invention it is intended to use at least three regenerators for heat exchange between crude and cleaned feeds as hereinbefore described, and at least one recuperator (countercurrent indirect heat exchanger, e.g. tube and shell type) for heat exchange between cleaned feed gas and the pure fractions.

The recuperative heat exchanger, which can also be a plurality of units, has an outlet opening near its middle to which is connected a pipe leading to an expansion turbine for expanding the gas to slightly above 1 atm., while its lower end has a pipe connection for removing the highly cooled fluid which may be gaseous or partly liquefied.

The double rectification column which is to be used for air fractionation has a pipe connection about just below its uppermost third for the introduction of expanded, cleaned air; and above the lowermost part of the low pressure section there is a pipe connection for highly cooled air which may be enriched with one of its components as a scavenging gas to the regenerator arrangement.

Without further elaboration, it is apparent that one skilled in the art can practice this invention without further explanation. For the purposes of illustration, however, the following preferred embodiment of the invention is presented; however, this embodiment is not to be considered limitative of the remainder of the specification and appended claims in any way whatsoever.

*Example*

Referring now to the drawing, 1,200 Nm.$^3$ air per hour are delivered by conduit 1 to the compressor 2 for compression to 6 atm. The compressed air passes through the manifold 4a to one of the regenerators 5, 6, or 7, which are cyclically interchangeable by conventional means. As shown on the drawing, the air from regenerator 5, which has been cooled and freed from water and $CO_2$, after traversing the multiple valve 8a, passes through conduit 9 to the junction 10. Of the 1,160 Nm.$^3$/h. of air that arrives at this junction, 780 Nm.$^3$/h. pass through conduit 11 and through multiple valve 8c to one of the regenerators (7), in its second cold cycle, while the remaining 380 Nm.$^3$/h. pass through the regulating valve 12 and conduit 13 to the lower part of the double rectification column 14. The purified air mass of 780 Nm.$^3$/h. is warmed in regenerator 7 while in its third cycle (the second cold period), regenerator 7 having already been freed in its second cycle by means of the scavenging air, of the ice and solid $CO_2$ deposited from the crude air in its first cycle. After leaving the regenerator, the warmed 780 Nm.$^3$/h. of air passes through multiple valve 4c and conduit 15 into the recuperative heat exchanger 16 wherein the warm air by indirect heat exchange heats a pure nitrogen and/or oxygen fraction to normal temperature (about 20° C.).

More specifically, the nitrogeen fraction, in the present example amounting to 600 Nm.$^3$/h., is taken from the head of the low pressure section of the rectification column 14 and delivered through conduit 17 to conduit 18, from which it may be withdrawn at normal temperature. From the lower portion of the low pressure section of the rectifying column 14 the oxygen fraction of 140 Nm.$^3$/h. is withdrawn and delivered through conduit 19 to recuperator 16 to the regulating valve 20 connected to conduit 21 from which the oxygen may also be withdrawn at normal temperature.

The greater part of the air which is delivered to the heat exchanger 16 by the conduit 15, about 500 Nm.$^3$/h., is removed from the middle of the heat exchanger by the conduit 22 and is passed through the expansion turbine 23. The expanded air then passes through conduit 24 and valve 24a for introduction into the low pressure section of the rectification column 14 at a point just below the uppermost third of the low pressure column. About 420 Nm.$^3$/h. of air are, at the same time, removed from just above the lower part of the low-pressure section and is passed through valve 25a, conduit 26 and through multiple valve 8b to one of the cyclically interchangeable regenerators, which in this case is the regenerator 6 now in its second cycle, namely in its first cold period. This air passing through the regenerator 6 serves to clean it from impurities such as water and $CO_2$ which are carried away by the current of air through the multiple valve 4b and discharged to the atmosphere through conduit 27. The regenerator 6 will then not contain any impurities during its third cycle, namely its second cold period, so that it will not be possible for impurities to be introduced into the main portion of the purified air while it is being reheated.

Instead of the expansion turbine 23, an expansion valve may also be used for expanding the cooled gas from the heat exchanger 16. This expanded gas may then be passed through the conduit 24 and valve 24a, and then combined with the impure fraction in the rectification column to be used as scavenging gas in the regenerator 6 during its second period.

Thus, the 420 Nm.$^3$/h. of air which is delivered by the conduit 26 to the regenerator 6 as scavenging gas revaporizes the 40 Nm.$^3$ of water vapor and $CO_2$ which has previously been deposited in the regenerator, and this gaseous mixture amounting to 460 Nm.$^3$/h. escapes through the conduit 27 to the atmosphere.

The expanded air can, alternatively or in combination, also pass from the conduit 24 through conduit 28 and regulating valve 29 into conduit 26 and through multiple valve 8b to the regenerator that is in its first cold period, without being first passed through the low pressure section of the rectification column.

From the lower part of the shell of the heat exchanger 16, liquid air will be withdrawn by the pipe 30, for delivery through the pipe 13 to the pressure section of the rectification column 14. From the same shell, but at a somewhat high level, a conduit 31 removes highly cooled gaseous air for delivery to the pipe 13. In this example, 60 Nm.$^3$/h. of liquid air will pass through the pipe 30, while 220 Nm.$^3$/h. of gaseous air will pass through conduit 31.

The double rectification column is, furthermore, provided with the usual accessories. Thus, the pipe 32 is arranged to conduct impure oxygen from the sump of the high pressure section to the expansion valve 33 for introduction into the low pressure section. Furthermore, the conduit 34 delivers the nitrogen from the main condenser to the circulation heater 35, and the conduit 36 then delivers it to the expansion valve 37 from which it passes into the head of the low pressure column as reflux liquid. At the same time, the liquid oxygen passes through the pipe 38 and adsorber 39 and then through the circulation heater 35, in which it is partly vaporized and is then returned by pipe 41 to the sump of the low pressure section of the rectification column.

As the above description shows, it is thus possible to obtain pure nitrogen as well as oxygen fractions in desired amounts by a very simple process, and without the products being contaminated by impurities.

In this example the sublimation ratio accounts to ca. 1.4.

The same process and apparatus with appropriate adaptations can also be used advantageously for the fractionation of other gaseous mixtures such as hydrogen-containing mixtures, hydrocarbon mixtures, and the like.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the low temperature fractional separation of a predetermined amount of a gas mixture in a rectification column, which process comprises the preliminary steps of passing an impure gas mixture feed through one of at least three cyclically interchangeable regenerators, the regenerator in the first cycle serving to cool said feed and condense the condensable impurities in the impure feed, the regenerator in the second cycle serving to remove the impurities by having a scavenger gas traverse the regenerator to sublime and carry away said impurities, and the regenerator in the third cycle serving to heat the cooled, clean feed resulting from the first cycle, the improvement which comprises passing an amount of said impure feed through the first-cycle regenerator in excess of the predetermined amount of gas mixture fractionated and separated in the rectification column, passing the heated excess of substantially unsaturated gas mixture effluent from the third-cycle regenerator in indirect heat exchange with pure gas fractions separated in the rectification column, expanding the excess gas mixture and passing it through the second-cycle regenerator as scavenger gas, thereby subliming and removing the condensed impurities obtained in the first cycle, and then discarding said scavenger gas with the condensed impurities therein.

2. In a process for the low temperature fractional separation of a predetermined quantity of gas mixture in a rectification column, which process comprises the preliminary steps of passing an impure gas mixture feed through one of at least three cyclically interchangeable regenerators, the regenerator in the first cycle serving to cool said feed and condense the condensable impurities in the impure feed, the regenerator in the second cycle serving to remove the impurities by having a scavenger gas traverse the regenerator to sublime and carry away said impurities, and the regenerator in a third cycle serving to heat the cooled, cleaned feed resulting from the first cycle, the improvement which comprises passing an amount of said impure feed through the first-cycle regenerator in excess of the predetermined amount of gas mixture to be separated in the rectification column, the resultant excess of the main substantially unseparated gas mixture being used in the second-cycle regenerator as scavenging gas, thereby subliming and removing the condensed impurities obtained in the first cycle, and then discarding said scavenger gas with the impurities, passing a portion of the resultant cooled cleaned feed through the third-cycle regenerator, said portion being heated therein; passing the resultant heated, cleaned feed from the third-cycle regenerator to a countercurrent heat exchanger having a warm and a cold end in indirect heat exchange relationship with at least one final product; diverting a major portion of said feed from a middle part of said countercurrent heat exchanger; expanding said major portion of the feed; passing the expanded major portion to the second-cycle regenerator whereby said expanded major portion serves as the scavenger gas; mixing the remaining minor portion of the feed from the cold end of the heat exchanger with the remaining portion of cooled cleaned effluent from the first-cycle regenerator; and passing the resultant mixture to the rectification column for separation into its components.

3. The process of claim 2 wherein a sublimation ratio of 1–4 is employed.

4. The process of claim 2 wherein a sublimation ratio of 1.3–2 is employed.

5. The process of claim 2 wherein said diverted major portion from said heat exchanger is expanded while doing external work, is then mixed with an impure fraction from the rectification column, and said mixture is passed as scavenger gas to the second-cycle regenerator.

6. In a process for the low temperature fractional separation of a predetermined amount of gas mixture in a rectification column, which process comprises the preliminary steps of passing an impure feed through one of at least three cyclically interchangeable regenerators, the regenerator in the first cycle serving to cool said feed and condense the condensable impurities in the impure feed, the regenerator in the second cycle serving to remove the impurities by having a scavenger gas traverse the regenerator to sublime and carry away said impurities, and the regenerator in the third cycle serving to heat the cooled, cleaned feed resulting from the first cycle, the improvement which comprises passing an amount of said impure feed through the first-cycle regenerator in excess of the predetermined amount of gas mixture fractionated and separated in the rectification column; passing a portion of the resultant cooled cleaned feed through the third-cycle regenerator, said portion being heated therein; passing the resultant heated, cleaned feed from the third-cycle regenerator to a countercurrent heat exchanger having a warm and cold end in indirect heat exchange relationship with at least one final product; diverting a major portion of said feed from said countercurrent heat exchanger; expanding said major portion of the feed while doing external work; passing at least a part of the expanded major portion to a low pressure section of a double rectification column; withdrawing from said section a slightly enriched gaseous major portion with one of the separation products; passing that withdrawn gas portion in conjunction with the remaining part of said expanded major gas portion to the second-cycle regenerator whereby said gas portions in conjunction serve as the scavenging gas; mixing the remaining minor portion of the feed from the cold end of the heat exchanger with the remaining portion from the first-cycle regenerator; and passing the resultant mixture to the lower part of the high pressure section of the rectification column for separation into its components.

7. The process of claim 1 wherein the impure feed is air.

8. The process of claim 2 wherein the impure feed is air.

9. The process of claim 6 wherein the impure feed is air.

10. An apparatus for the low temperature separation of a gas mixture, which apparatus comprises in combination three cyclically interchangeable and interconnected regenerators, each having a warm and cold end, the regenerator in the first cycle serving to cool said gas mixture feed and condense the condensable impurities in the impure feed, the regenerator in the second cycle serving to remove the impurities by having a scavenger gas traverse the regenerator to sublime and carry away said impurities, and the regenerator in the third cycle serving to heat the cooled, cleaned feed resulting from the first cycle, a rectification column having an inlet line connected with the cold end of a regenerator in its first cycle, the rectification column having outlet lines carrying cold separated products therefrom through a heat exchange means, the regenerator in the third cycle having an outlet line at its warm end which carries warmed gas mixtures to said heat exchange means where they are indirect-heat-exchanged with the cold separated products, an expansion turbine having an inlet line connected with said heat exchange means to remove and expand resulting cooled gas mixture, a conduit connecting the outlet of the turbine with the inlet of a regenerator in its second cycle thereby to carry expanded gas mixture thereto which acts as a scavenging gas.

11. An apparatus for the low temperature separation of gases, which apparatus comprises in combination three cyclically interchangeable and interconnected regenerators each having a warm and a cold end and a first, second and third cycle, at least one indirect vertically positioned shell and tube heat exchanger, a double rectification column containing an upper low-pressure section and a lower high pressure section, an expansion turbine, said heat exchanger having an upper inlet on the shell side thereof connected to the warm end of one of said regenerators being in its third cycle, the shell side having at the middle part thereof a conduit connected to an expansion turbine inlet and the lower end of the shell side having at least one discharge conduit connected in conjunction with the cold end of one of said regenerators in its first cycle to the bottom portion of the high pressure section of said double rectification column, the low pressure section of said column being provided with an inlet conduit below and adjacent to its upper third, said conduit being connected by way of a control valve to the outlet of said expansion turbine, said low pressure section being additionally provided with a conduit positioned above its lower portion, said latter conduit being connected by way of a second control valve to one of said cyclically interchangeable regenerators being in its second cycle.

12. An apparatus according to claim 1 which apparatus further comprises a connection with a control valve between the outlet conduit of the expansion turbine and the conduit to one of said regenerators being in its second cycle.

References Cited by the Examiner

UNITED STATES PATENTS

| | | | |
|---|---|---|---|
| 2,460,859 | 2/1949 | Trumpler | 62—15 |
| 2,626,510 | 1/1953 | Schilling | 62—14 |
| 2,650,481 | 9/1953 | Cooper | 62—14 |
| 2,655,796 | 10/1953 | Rice | 62—14 |
| 2,673,456 | 3/1954 | Scharmann | 62—13 |
| 2,946,199 | 7/1960 | Collins | 62—38 |
| 2,960,836 | 11/1960 | Haringhuizen | 62—13 |
| 3,100,696 | 8/1963 | Becker | 62—14 X |

FOREIGN PATENTS 567,653   5/1958   Belgium.

NORMAN YUDKOFF, *Primary Examiner.*